(12) United States Patent
Wang et al.

(10) Patent No.: US 7,732,506 B2
(45) Date of Patent: Jun. 8, 2010

(54) RADIATION-CURABLE COMPOSITIONS FOR IMPROVED WEATHER RESISTANCE

(75) Inventors: Mingzhe Wang, Vernon Hills, IL (US); Michael Edward O'Brien, Hainesville, IL (US); Rick Tabor, Glenview, IL (US)

(73) Assignee: Stepan Company, Northfield, IL (US)

( * ) Notice: Subject to any disclaimer, the term of this patent is extended or adjusted under 35 U.S.C. 154(b) by 916 days.

(21) Appl. No.: 11/406,980

(22) Filed: Apr. 19, 2006

(65) Prior Publication Data

US 2007/0249751 A1 Oct. 25, 2007

(51) Int. Cl.
*C08F 2/46* (2006.01)
*C08J 3/28* (2006.01)

(52) U.S. Cl. .................. 522/179; 522/151; 522/152; 522/153; 522/154; 522/173; 522/97; 522/90; 522/104; 522/108; 522/150; 522/174; 522/178; 522/181; 522/182

(58) Field of Classification Search ............... 522/104, 522/108, 90, 97, 150, 151, 152, 153, 154, 522/173, 174, 178, 179, 181, 182
See application file for complete search history.

(56) References Cited

U.S. PATENT DOCUMENTS

| 4,031,289 | A | 6/1977 | Sergovic |
|---|---|---|---|
| 4,101,493 | A | 7/1978 | Nakagawa et al. |
| 4,397,989 | A | 8/1983 | Adesko |
| 4,590,219 | A | 5/1986 | Nissen et al. |
| 5,069,929 | A | 12/1991 | Aria et al. |
| 5,376,460 | A | 12/1994 | Hardeman et al. |
| 5,543,232 | A | 8/1996 | Ehrhart et al. |
| 5,596,049 | A | 1/1997 | Gallucci et al. |
| 5,620,801 | A | 4/1997 | Binns et al. |
| 5,639,560 | A | 6/1997 | Moens et al. |
| 5,719,227 | A | 2/1998 | Rosenberry et al. |
| 5,843,576 | A | 12/1998 | Rosenberry et al. |
| 6,569,352 | B1 * | 5/2003 | Hillshafer et al. ...... 252/182.27 |
| 6,664,363 | B1 * | 12/2003 | Faunce .................... 528/295.5 |
| 6,714,712 | B2 | 3/2004 | Bishop et al. |
| 6,855,844 | B1 * | 2/2005 | Geiger et al. ................. 560/76 |
| 2006/0084716 | A1 | 4/2006 | Zahora et al. |

FOREIGN PATENT DOCUMENTS

| EP | 1 142 912 | 10/2001 |
|---|---|---|
| WO | WO 01/30878 | 5/2001 |

OTHER PUBLICATIONS

International Search Report for PCT/US06/14714, dated Feb. 5, 2007.
International Preliminary Report on Patentability corresponding to International Application Serial No. PCT/US2006/014714, mailed Oct. 30, 2008, 6 pages.
Dow® TONE™ Polymers Monomers Polyols Breakthrough: Products and Applications—Adhesives, http://www.dow.com/tone/prodapp/adhesive.htm (last visited Jun. 6, 2006).
BYK Gardner Instruments, QC Solutions for Coatings and Plastics, 2005-2006, The New Spectro-Guide, pp. 125-126.
Supplementary European Search Report corresponding to European Patent Application Serial No. 06750690.7-1214, dated Feb. 2, 2009.

* cited by examiner

*Primary Examiner*—Sanza L McClendon
(74) *Attorney, Agent, or Firm*—McAndrews, Held & Malloy, Ltd.

(57) ABSTRACT

Disclosed are radiation-curable compositions comprising at least one ortho-phthalate (meth)acrylate, and optionally a (meth)acrylate monomer, a stabilizing package, an adhesion promoter, and/or a photoinitiator. The compositions maintain physical integrity when cured and then aged for seven days under the conditions of 70% relative humidity, 77° C. black panel temperature, 55° C. chamber air temperature and a light intensity of 0.51 $W/m^2/nm$ at 340 nanometer wavelength passed through a daylight filter. The preparation and use of these compositions are also disclosed.

11 Claims, 3 Drawing Sheets

//<br>
RADIATION-CURABLE COMPOSITIONS FOR IMPROVED WEATHER RESISTANCE

RELATED APPLICATIONS

[Not Applicable]

BACKGROUND OF THE INVENTION

The presently described technology relates to a novel radiation-curable composition comprising at least one orthophthalate (meth)acrylate of the present technology, and optionally a (meth)acrylate monomer and/or a photoinitiator. The presently described technology also relates to the preparation and use of these compositions.

In many radiation-curable compositions, oligomers having reactive terminal groups are prepared from polyesters, epoxies, polyethers, and polyurethanes. Among the different polymer backbone building blocks, polyester polyols are particularly desirable because of their commercial availability and oxidative stability (compared to polyether polyols). Polyester polyols are also particularly desirable because their characteristics may be tailored to suit a variety of property requirements such as adhesion to a broad range of substrates, weather resistance, abrasion resistance, flexibility, hardness, solvent resistance, and mechanical strength. However, previous polyester polyols, in general, are susceptible to hydrolysis reactions and oxidative cross linking reactions in the presence of light, heat, and humidity, where radiation-curable coatings are frequently used. These disadvantages of polyester polyols can result in color development, loss of gloss, and/or change of mechanical properties of the cured compositions.

There have been ongoing efforts to employ different polyester polyol resins in compositions in order to improve the stability of a resultant finish. One method is to use modifiers to improve resin weatherability as disclosed by U.S. Pat. No. 5,596,049 (General Electric Company, Pittsfield, Mass.), which discloses polyester compositions indicated to have improved hydrolytic stability. An improvement in hydrolytic stability is said to be achieved by blending a difunctional polyepoxy compound, a catalyst, and other additives. However, the addition of these minor components often complicates the matter, and could lead to incompatibility as well as other problems for the formulators.

Another method is to incorporate bulky glycols or to use glycols that are highly hydrophobic and stable in the polyesters. U.S. Pat. No. 4,397,989 (E.I. Du Pont de Nemours & Co., Wilmington, Del.) discloses a polyester resin from the reaction of neopentyl glycol and at least one other hindered primary diol with polycarboxylic acids. The resin is allegedly useful in coating compositions to impart weatherability and other properties to a resulting finish.

U.S. Pat. No. 5,620,801 (BHP Steel (JLA) Pty. Ltd., Melbourne, Australia) describes a polyester resin for use in a thermosetting coating composition that, when cured, is said to provide good gloss retention and resistance to color change. The polyester resin is made by polymerizing an alcohol component comprising mainly neopentyl glycol, hydroxyl pivalate, and a polyol trifunctional branching agent with polyacids. Not only is the availability of these types of polyalcohols very limited, but they cost much more than commonly available polyalcohols, such as ethylene glycol, diethylene glycol and propylene glycol.

Yet another method that has been explored is to use saturated aliphatic acids to prepare polyester resins in order to maintain color stability. For example, U.S. Pat. No. 4,590,219 (BASF Aktiengesellschaft, Ludwigshafen, DE) teaches the use of adipates to improve light fastness. For another example, Dow Chemical Company (Midland, Mich.) (http://www.dow.com/tone/prodapp/adhesive.htm) states that poly-caprolactone polyester resins sold under the trade name of TONE™ exhibit better hydrolytic stability, color and uniformity than other polyester polyols.

U.S. Pat. No. 5,376,460 (DSM N.V., Heerlen, Netherlands) discloses polyester polyols that are said to result in coatings with good outdoor durability. The polyester polyols, which are said to have a molecular weight (number average) in the range of from about 2,600 to about 10,000, are obtained by the reaction of a polyalcohol and at least 50 mol % of a saturated diacid, such as, 1,4-cyclohexanedicarboxylic acid and/or tetrahydrophthalic anhydride. This disclosure teaches that substantially aromatic acid free compositions result in coatings with excellent gloss and improved resistance to UV light.

U.S. Pat. No. 5,543,232 (Amstrong World Industries, Inc., Lancaster, Pa.) discloses a resin composition comprising an acrylate polyester, the polyester being the reaction product of a diol and an aromatic polycarboxylic acid or anhydride, preferably trimellitic anhydride. In its preferred embodiment, a tricarboxylic acid or anhydride is used, although a cycloaliphatic acid, tere-phthalic acid, iso-phthalic acid, or ortho-phthalic acid can be added as a minor acid. This reference states that there was less yellowing due to aging because of the use of cycloaliphatic acid.

The study of how to improve the weatherability of polyester resins made from aromatic acids has been extensive because of their relatively lower cost and good performance. Amoco Chemical Company (Chicago, Ill.) states that polyester resin comprising iso-phthalic acid residues renders a finished coating with improved hydrolytic resistance (GTSR-106A, Dec. 12, 1995, Amoco Chemicals Technical Information). U.S. Pat. No. 5,639,560 (U C B S.A., Brussels, Belgium) also discloses a UV curable composition containing a crystalline polyester containing end carboxyl groups from a reaction product of 85 to 100 mol % tere-phthalic acid or 1,4-cyclohexanedicarboxylic acid with 85 to 100 mol % of a saturated, straight-chain, aliphatic diol. This composition is intended to provide a coating that is resistant to solvents and weathering as well as having other desired properties.

U.S. Pat. No. 6,714,712 (DSM N.V., Heerlen, Netherlands) discloses radiation-curable coating, ink, or matrix compositions for optical fiber applications. The composition contains a urethane free polyester (meth)acrylate oligomer that is a reaction product of a polyester polyol with (meth)acrylic acid. The polyester polyol is derived from a polybasic acid, preferably adipic acid, iso-phthalic acid, tere-phthalic acid, dimer fatty acid, or a mixture thereof, and a polyalcohol, preferably ethoxylated bisphenol-A, propoxylated bisphenol-A, neopentyl glycol, 2-butyl-2-ethyl-1,3-propanediol, 2-methyl-1,3-propanediol, hydroxyl pivaloyl hydroxyl pivalate, 2,4-diethyl-1,5-pentanediol, or mixtures thereof. The disclosed composition reportedly cures to a finished coating having excellent hydrolytic resistance. Ortho-phthalate diethylene glycol based polyester acrylates are used for improved hydrolysis and thermal stability. However, the cured composition in the examples, comprising an ortho-phthalate diethylene glycol based polyester acrylate, failed to maintain color stability. On the other hand, the preferred iso-phthalic acid is more expensive than ortho-phthalic acid or phthalic anhydride, and it costs more to make polyester polyols based on iso-phthalic acid or tere-phthalic acid than those based on ortho-phthalic acid or anhydride. Moreover, polyester polyols based on tere-phthalic acid tend to precipitate when they are stored, and this adds extra expense to maintain property homogeneity.

While iso-phthalic acid, tere-phthalic acid and their derivatives have been shown to improve weatherability, phthalic anhydride has not been proposed for such purposes. Two references teach that polyester polyols based on tere- and iso-phthalic acids, as compared with ortho-phthalic acid or anhydride, are more resistant to hydrolysis and show better thermal stability. See S. Paul, "*Surface Coatings Science & Technology,*" 2$^{nd}$ Edition, Edited by Swaraj Paul, Printed by John Wiley & Sons Ltd., 1997 ISBN 0 471 95818 2; V. V. Korshak and S. V. Vinogradova, "*Polyesters*," translated from Russian by B. J. Hazzard, translation edited by J. Burdon, Pergamon Press, 1965, Library of Congress Catalog Card No. 63-10048. Another reference also teaches that polyester alkyds derived from iso-phthalic and tere-phthalic acids had superior thermal stability to ortho-phthalic polyester. A. L. Smith, L. M. Brown, L. J. Tyler and M. J. Hunter, *Ind. Eng. Chem.*, 49, No. 11, 1903 (1957).

It is also disclosed in the literature that polyester polyols made from iso-phthalic and tere-phthalic acid outperform their ortho-phthalic acid or anhydride counterpart in terms of weatherability. U.S. Pat. No. 4,031,289 (The Burns & Russell Company of Baltimore City, Baltimore, Md.) discloses that it is critical to use iso-phthalic acid and neopentyl glycol to make a polyester polyol for use in formulation of a coating that can have improved water resistance. It also teaches that employing phthalic anhydride or ortho-phthalic acid to replace iso-phthalic acid results in the loss of water resistance.

BRIEF SUMMARY OF THE INVENTION

The presently described technology relates to novel radiation-curable compositions comprising (meth)acrylate oligomers containing residues of ortho-phthalic acid or phthalic anhydride, i.e., ortho-phthalate (meth)acrylate oligomers, which can be either polyester acrylates or polyester urethane acrylates. Contrary to a common belief in the prior art, it has been surprisingly found that at least some embodiments of the radiation-curable composition of the presently described technology may provide one or more of the following benefits: a cost advantage, improved storage stability, weather resistance, adhesion, wear resistance, hardness, flexibility, chemical resistance, gloss, or ease of handling.

The composition of the present technology optionally can contain one or more reactive diluents such as (meth)acrylate monomers, a stabilizing package including one or more light stabilizers, at least one adhesion promoter, and/or one or more photoinitiators. The presently described technology also relates to the preparation and use of such radiation-curable compositions.

In one aspect, the presently described technology provides a radiation-curable composition comprising:

(i) at least one ortho-phthalate (meth)acrylate oligomer;
(ii) optionally, at least one photoinitiator; and
(iii) optionally, at least one reactive diluent, wherein the composition maintains physical integrity when cured and then aged for seven days under the conditions of 70% relative humidity, 77° C. black panel temperature, 55° C. chamber air temperature and a light intensity of 0.51 W/m$^2$/nm at 340 nanometer wavelength passed through a daylight filter. The (meth)acrylated oligomer of the presently described technology can be a polyester (meth)acrylate or a urethane (meth)acrylate containing a residue of ortho-phthalic acid, phthalic anhydride, or a mixture thereof. The radiation-curable composition can further comprise at least one light stabilizer, at least one adhesion promoter such as a phosphate acrylate, and/or other additives.

In another aspect of the present technology, a radiation-curable composition is provided consisting essentially of:

(i) one or more ortho-phthalate (meth)acrylate oligomers;
(ii) optionally, at least one photoinitiator; and
(iii) optionally, at least one reactive diluent, wherein the composition maintains physical integrity when cured and then aged for seven days under the conditions of 70% relative humidity, 77° C. black panel temperature, 55° C. chamber air temperature and a light intensity of 0.51 W/m$^2$/nm at 340 nanometer wavelength passed through a daylight filter. The radiation-curable composition can further include one or more light stabilizers, at least one adhesion promoter such as a phosphate acrylate, and/or other additives. In some embodiments, the radiation-curable composition of the present technology does not contain acrylated oligomers other than polyester acrylates and urethane acrylates, and in some embodiments does not contain acrylated oligomers other than the one or more ortho-phthalate (meth)acrylate oligomers of the present technology.

DETAILED DESCRIPTION OF THE INVENTION

Figure 1:
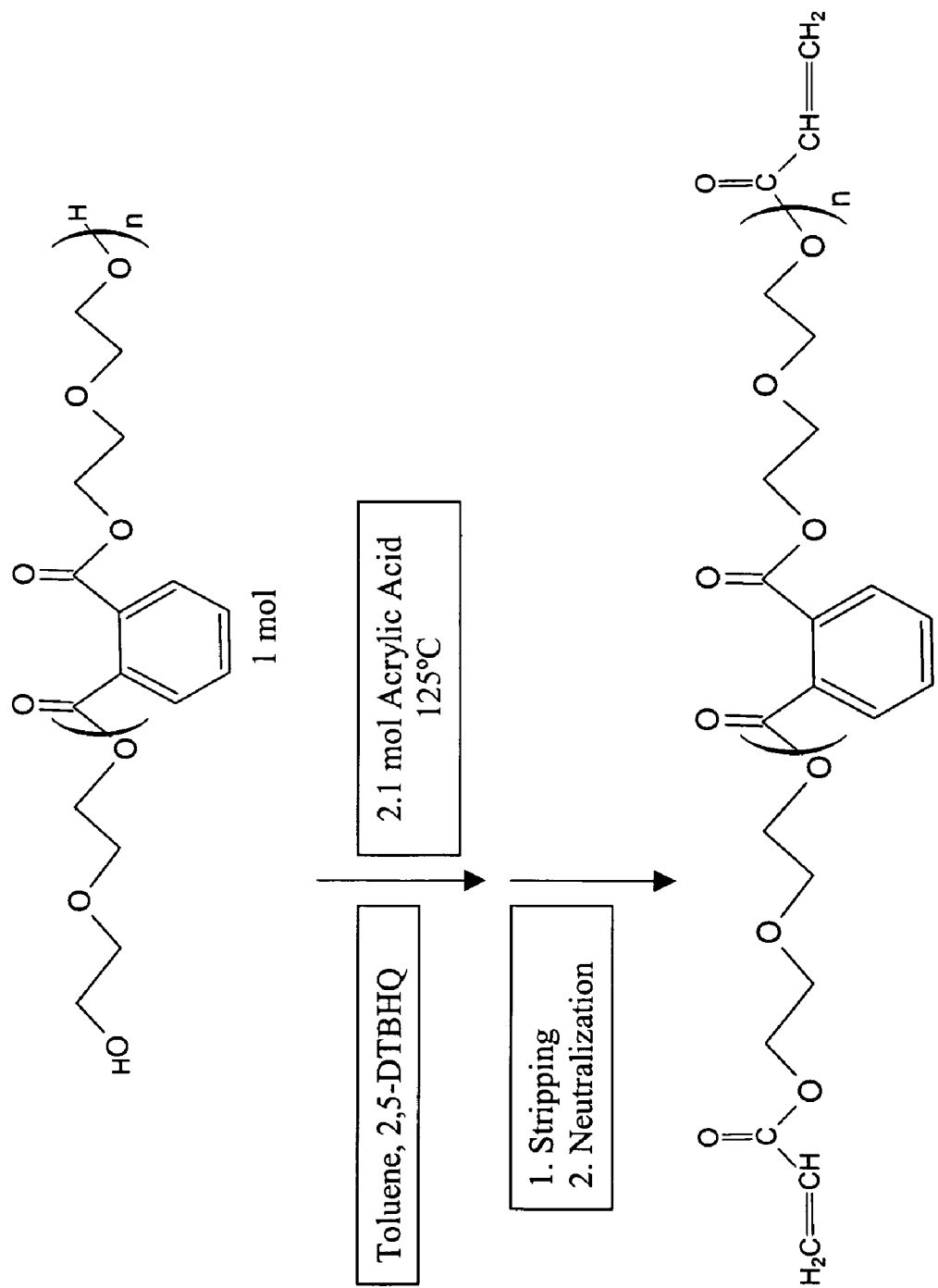
FIG. 1 shows a representative reaction scheme for the preparation of a ortho-phthalate polyester acrylate.

The presently described technology provides compositions curable by ultraviolet irradiation (UV) or by accelerated electron beams (EB). The binder resin of the composition comprises at least one ortho-phthalate (meth)acrylate. The radiation-curable composition of the present technology can be used to produce paint and varnish coatings, inks, adhesives, or sealants that exhibit one or more advantageous properties including excellent weather resistance, excellent solvent and chemical resistance, a good combination of flexibility and hardness, and excellent mechanical properties.

As used herein, the term "(meth)acrylate" means methacrylate, acrylate, or a mixture thereof. Generally, acrylates are preferred over methacrylates because it is known in the art that compositions with acrylates normally have higher cure rate.

As used herein, the term "(meth)acrylic acid" refers to acrylic acid, methacrylic acid, or a mixture of them. More broadly, words containing the root "(meth)acryl-" refer to acryl-, methacryl-, or a mixture thereof.

The term "isocyanate" is used herein to refer to any compound that has one or more isocyanate groups.

As used herein, the term "urethane acrylate" or "urethane (meth)acrylate" stands for the reaction product of a polyol (e.g., a polyester polyol) or a mixture of polyols with an isocyanate or a mixture of isocyanates and a hydroxyl functioning (meth)acrylate.

Some of the abbreviations used in the present application include DEG for diethylene glycol; TPA for tere-phthalic acid; OHV for hydroxyl number reported as mg KOH/g; AV for acid value reported as mg KOH/g; EB for electron beam curing energy; UV for ultraviolet light curing energy.

It has been surprisingly found that certain polyester polyols or resins made from phthalic anhydride and/or ortho-phthalic acid have superior hydrolytic stability to other polyester polyols including those made from polycaprolactone, adipates, tere-phthalates and iso-phthalates. It has also been surprisingly found that an energy-curable composition comprising a (meth)acrylate oligomer having desired weatherability can be made without additional ingredients by incorporating ortho-phthalate polyols into the (meth)acrylate oligomer of the present technology.

It has been discovered that reacting ortho-phthalate resins with (meth)acrylic acid or isocyanate compounds and a hydroxyl containing acrylate compound under certain conditions leads to the formation of acrylated resins that cure in response to ultraviolet light radiation and electron beams. The acrylated resins of the presently described technology can be incorporated into compositions and cured under UV light or EB to render gloss finishes. These finishes are more weather resistant when compared to prior art finishes obtained by UV or EB curing which contain, for example, adipates or tere-phthalate resins.

The radiation-curable composition of the presently described technology can maintain physical integrity when cured and then aged for 7 days under the conditions of 70% relative humidity, 77° C. black panel temperature, 55° C. chamber air temperature and a light intensity of 0.51 W/m$^2$/nm at 340 nanometer wavelength passed through a daylight filter. As used herein, the term "physical integrity" means that (1) on one hand, the coating film remains intact such that specimens can be prepared and mounted on a material testing machine for the measurement of various properties such as tensile, modulus and elongation, and (2) on the other hand, the coating film experiences limited color change. As used herein, limited color change means that the calculated color change ($\Delta E$) of the coating film meets one of the following two conditions: (a) $\Delta E<5$ if measured on a film coated on aluminum Q-Panel prepared as described in Example 6; (b) $\Delta E<2.6$ if measured on a film coated on Leneta Chart Form 2A black area as specified for application parameters in Example 11. The method to calculate color changes is described below in the description of test methods.

A (meth)acrylate derived from polyester polyols can be a polyester (meth)acrylate or a polyester urethane (meth)acrylate. The polyester polyols or resins contemplated for the properties achievable through the presently described technology include a structure as shown in the general formula (I) below:

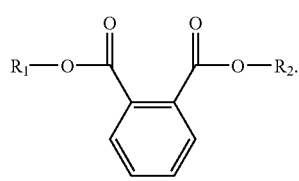

Structure of an ortho-phthalate polyol $R_1$ and $R_2$ in formula (I) are independent residuals of aliphatic alcohols and/or their derivatives. Such derivatives of aliphatic alcohols can be, for example, the products from esterification reaction of the alcohols with one or more compounds containing carboxylic acid groups.

The polyester polyols or resins suitable for use in the presently described technology to make the (meth)acrylate oligomers can be obtained by any suitable method. For example, the polyester polyol or resin can be derived from reacting one or more polycarboxylic acids (hereafter referred to as polyacids) containing ortho-phthalic acid or phthalic anhydride with one or more polyhydric alcohols (hereafter referred to as polyalcohols) to obtain polyester polyols including the structure shown in formula (I).

The polyacids used in the present technology can be phthalic anhydride and/or ortho-phthalic acid. However, phthalic anhydride and ortho-phthalic acid can be combined with other polyacids to make the polyester polyols suitable for the present technology. Examples of such polyacids include iso-phthalic acid, tere-phthalic acid, maleic acid or anhydride, adipic acid, glutaric acid, azelaic acid, sebacic acid, pyromellitic acid or dianhydride, cyclahexanedicarboxylic acid, tetrahydrophthalic acid or anhydride, hexahydrophthalic acid or anhydride, dodecanedicarboxylic acid, dimer fatty acid and the like, their suitable derivatives, and mixtures thereof.

When phthalic anhydride or ortho-phthalic acid is replaced partially by other acids, the amount of phthalic anhydride and/or ortho-phthalic acid to be replaced preferably can be less than 90 mol %, alternatively less than 75 mol %, alternatively less than 65 mol %, alternatively less than 50 mol %.

Polyalcohols for the presently described technology can be selected from a wide range of multi-alcoholic functioning compounds well-known in the art. Suitable polyalcohols can comprise "n" alcoholic functioning hydroxyl groups in each molecule, where "n" can be in the range of from about 2 to about 20, alternatively from about 2 to about 8, alternatively from about 2 to about 4. Examples of such polyalcohols include, but are not limited to, 1,2-propanediol, 1,3-propanediol, dipropylene glycol, tripropylene glycol, ethylene glycol, diethylene glycol, triethylene glycol, tetraethylene glycol, 1,4-butanediol, neopentyl glycol, 1,6-hexanediol, dihydroxylmethylcyclohexane, 2-butyl-2-ethyl-1,3-propanediol, glycerol, trimethylolpropane, pentaerythritol, their alkoxylated derivatives, and mixtures thereof.

The polyester polyol obtained through the preferred condensation method can be subject to further treatment to yield a modified polyester polyol that is still (or more) suitable for making (meth)acrylate oligomers of the presently described technology. Such modifications can be, for example, a homogenization reaction of the polyester polyols with a natural oil, for example a drying oil such as castor oil or soybean oil, and/or an alkoxylation reaction as described in U.S. Pat. Nos. 6,569,352 and 6,855,844 (both to Stepan Company, Northfield, Ill.). The polyester-ether polyols of U.S. Pat. Nos. 6,569,352 and 6,855,844 can be, for example, the reaction products of a phthalic acid based material (e.g., phthalic anhydride or ortho-phthalic acid), diethylene glycol, and propylene oxide. Preferred catalysts to prepare the phthalate polyester polyols include, but are not limited to potassium hydroxide and double metal cyamide complex catalysts.

Another kind of modified polyester polyols is described in U.S. Pat. No. 6,664,363 (Stepan Company, Northfield, Ill.), which relates to low viscosity aromatic polyester polyols having an average functionality of two and prepared by reacting a phthalic acid based material with diethylene glycol, a higher functional polyol having an average functionality of greater than two, and a long chain alkyl acid, ester or oil. The teachings of U.S. Pat. Nos. 6,569,352, 6,855,844, and 6,664,363 are incorporated herein by reference in their entirety.

The ortho-phthalate (meth)acrylate oligomer of the presently described technology can be derived from the reaction of an ortho-phthalate polyol with, (i) a (meth)acrylic acid or a derivative thereof; or (ii) an isocyanate compound and a hydroxyl containing (meth)acrylate compound, following the standard procedures commonly practiced in the art.

More specifically, polyester (meth)acrylates can be obtained by esterifying polyester polyols with (meth)acrylic acid or its ester derivatives followed by a post treatment. This method is illustrated by the reaction scheme in FIG. 1. In a contemplated embodiment, the reaction of a polyester polyol with a (meth)acrylic acid or its ester derivatives is preferably carried out to such a degree, and the reaction product can be post treated in such a manner, that the polyester (meth)acrylate oligomer is substantially acid free. In accordance with at least one embodiment of the presently described technology, it is preferred that the acid value of the polyester (meth)acrylate as expressed in milligrams of potassium hydroxide per gram of sample is less than 20.0, alternatively less than 15.0, alternatively less than 10.0, alternatively less than 5.0, alternatively less than 3.0.

Figure 2:
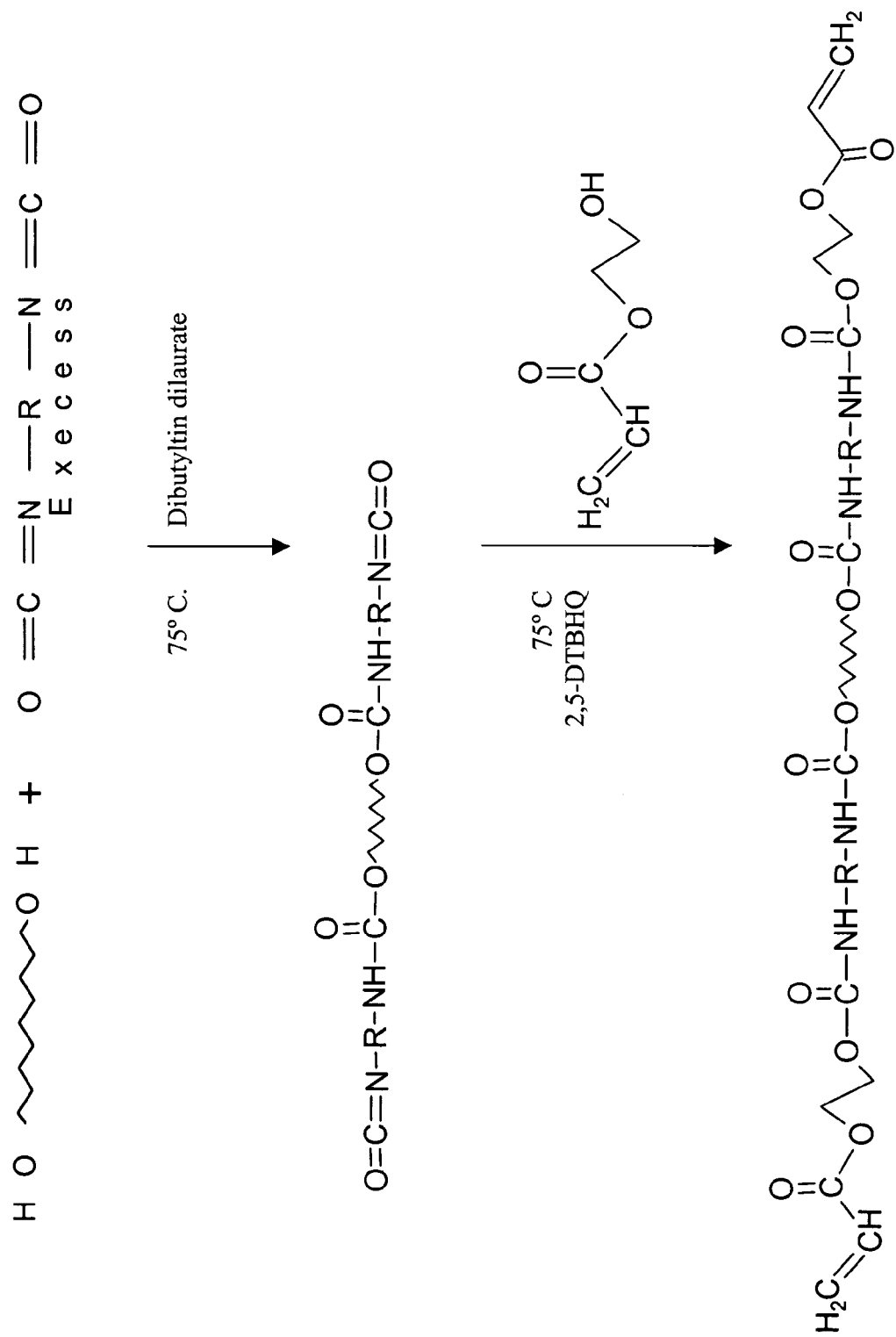
FIG. 2 shows a representative reaction scheme for the synthesis of a urethane acrylate.

Polyester urethane (meth)acrylates, on the other hand, can be prepared by, for example, reacting a polyester polyol or resin with an excess amount of an isocyanate to make an isocyanate-terminated prepolymer, which can then be reacted with a hydroxyl functioning (meth)acrylate. This method to make a polyurethane acrylate is illustrated by the reaction scheme in FIG. 2. An alternative way to make a polyurethane acrylate is to form a prepolymer by reacting a hydroxyl functioning (meth)acrylate with an excess amount of an isocyanate, and then adding a polyester polyol to the prepolymer.

Preferably, the radiation-curable composition of the present technology contains from about 15 to about 100 wt %, more preferably, from about 25 to about 99 wt %, particularly preferably, from about 35 to about 98 wt %, and most preferably from about 45 to about 97 wt % of the ortho-phthalate (meth)acrylate oligomer of the present technology, based on the total weight of the composition.

Because incomplete cure of the resulting finish can lead to poor performance of a coating, a photoinitiator package is preferably included in the composition to ensure sufficient curing if the composition is to be cured by UV light, for example. However, the cure of a finish also depends on the source of the radiation and the duration of the exposure of the composition to the radiation. When EB is used, normally no photoinitiator is needed.

A routine test can be conducted by a user of the present technology to establish the cure condition for a composition. Sufficiency of cure can be established by monitoring the remaining unsaturation of the cured film, by plotting the development of desired property versus the speed or dosage of curing, etc.

The photoinitiator package suitable for the presently described technology can include any one or more initiators now or to be known in the art, provided that the selected initiator(s) and conditions employed are sufficient to ensure curing sufficiency as described above. Suitable initiators include, for example, IRGACURE® 651, IRGACURE® 819, and DAROCURE® 1173, all available from Ciba Specialty Chemicals, Inc. (Tarrytown, N.Y.). The amount of the photoinitiator package can be sufficient to ensure a sufficient cure. The proportion of initiator can be, for example, from about 0.5 to about 10 weight %, alternatively from about 1.0 to about 8.0 weight %, alternatively from about 1.5 to about 6.0 weight %, alternatively from about 2.0 to about 5.0 weight %, based on the total weight of the composition.

One or more reactive diluents can be added to the radiation-curable composition of the presently described technology to reduce the viscosity of the composition and facilitate ease of handling. But the addition of reactive diluents to a composition can also alter the hardness and adhesion of the resultant finish. This could in turn have an impact on the mar resistance, abrasion resistance and/or chemical resistance of the resultant finish. Therefore, the amount and type of reactive diluents to be added optionally can be chosen such that the resulting finish will have the most desired properties. A person familiar with the background technology involved here will understand how to use routine tests to determine the amount and type(s) of reactive diluents needed for a specific application of the presently described technology. In accordance with at least one embodiment of the present technology, the amount of reactive diluents in the radiation-curable composition can be less than 75 weight %, alternatively less than 65 weight %, alternatively less than 55 weight %, alternatively less than 45 weight %, alternatively less than 35 weight %.

There are a variety of reactive diluents commonly available in the art. Examples of these reactive diluents include, but are not limited to, hexanediol diacrylate, trimethylolpropane triacrylate, alkoxylated trimethylolpropane triacrylate, pentaerythritol tetraacrylate, tripropylene glycol diacrylate, alkoxylated glycerol triacrylate, neopentyl glycol diacrylate, alkoxylated phenol acrylate, isobornyl acrylate, (alkoxylated)cyclohexane diacrylate, or mixtures thereof.

Optionally, one or more additives can be added to the radiation-curable composition for the purpose of enhancing a specific property or tackling a particular problem. Examples of additives that can be added include, but are not limited to, adhesion promoters, wetting agents, debubbling agents, flow modifiers, light stabilizers, color stabilizers, antistatic agents, anti-fungi agents, antioxidants, UV absorbers, silane coupling agents, coating surface improvers, heat polymerization inhibitors, leveling agents, surfactants, colorants, preservatives, plasticizers, lubricants, solvents, fillers, aging preventives, extenders, etc. The type and amount of an additive shall be chosen such that the composition can impart the desired properties to a finish without imposing other problems. In one embodiment, the amount of the adhesion promoter can be less than 35 weight %, alternatively less than 25 weight %, alternatively less than 15 weight %, alternatively less than 10 weight %.

In a particular embodiment, a phosphate acrylate can be added to the radiation-curable composition to promote the adhesion of a finish to metal substrates. The phosphate acrylate can be added to the radiation-curable composition directly or added to the polyester polyol before or after acrylation of the polyester polyol. Suitable phosphate acrylates include mono-, di- and tri-phosphate (meth)acrylates. The structure of a phosphate acrylate can be represented by the following general formula:

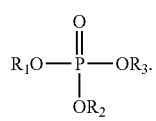

(II)

Structure of Phosphate Acrylate $R_1$, $R_2$ and $R_3$ in formula (II) can be any combination of H, (meth)acrylate, alkoxy, —$CH_2CH_2O(C=O)CH=CH_2$, alkyl-acrylate, alkyl, alkene and/or alkyne groups. Examples of suitable phosphate acrylates for the presently described technology include dihydroxylalkylacrylate or dihydroxyalkylmethacrylate phosphate ester, monohydroxyalkylacrylate or monohydroxyalkylmethacrylate phosphate ester, and combinations thereof. Preferably, the phosphate acrylates added to the radiation-curable compositions of the present technology are a blend of mono- and di-acrylate or mono- and di-methacrylate-containing phosphates.

The composition of the present technology can be used in coatings, adhesives, sealants, elastomers, other radiation-curable compositions, foams, and other applications that require the use of a polyester residual or that require good weather and hydrolytic resistance.

The presently described technology can provide a radiation-curable composition that forms a finish or body having excellent weather resistance. Furthermore, the prior art uses or prefers more expensive raw building blocks such as isophthalic acid, tere-phthalic acid, adipic acid, etc., to improve weather resistance. This not only restricts the availability of raw materials and adds cost to the polyester resins, but can also result in a stability issue as well as other problems. In contrast, the presently described technology utilizes relatively cheap and widely available building blocks—orthophthalic acid and/or phthalic anhydride—to make polyester polyol resins for use in radiation-curable compositions, which when cured, can provide excellent weatherability without the aid of other types of acrylate oligomers. The presently described technology also imparts versatility to modify the properties of polyester resin.

The presently described technology also makes it possible to use a wide variety of glycols to make polyester resins suitable for radiation-curable compositions that can still yield a finish that is weather resistant and has many other desired properties. By using readily available and relatively cheap glycols (such as ethylene glycol or diethylene glycol), the present technology can dramatically reduce the cost to achieve the desired properties. In contrast, literature in the relevant art teaches that polyol resins made from ortho-phthalic acid and/or phthalic anhydride with many glycols are not suitable for applications requiring good weatherability performance.

The presently described technology and its advantages will be better understood by reference to the following examples. These examples are provided to describe specific embodiments of the present technology. By providing these specific examples, the inventors do not limit the scope and spirit of the present technology. It will be understood by those skilled in the art that the full scope of the presently described technology encompasses the subject matter defined by the claims appending this specification, and any alterations, modifications, or equivalents of those claims.

Polyols used in the examples for the preparation of acrylates are either commercially available materials or synthesized in the lab as shown in the examples.

The monomers used include, but are not limited to, hexanediol diacrylate, designated as HDODA, which is a two functional acrylate, and trimethylolpropane triacrylate, referred to as TMPTA, which is a tri-functional acrylate. Both monomers are from Cytec Surface Specialties (Brussels, Belgium).

The oligomers used include, but are not limited to, CN963E75 acrylate (a urethane acrylate dissolved in SR454), CN2261 acrylate (a tetrafunctional polyester acrylate), CN120Z acrylate (an epoxy acrylate), PS2002A acrylate (a polyester acrylate derived from STEPANPOL® PS-2002 polyol), PD90LV-UA acrylate (a urethane acrylate derived from STEPANPOL® PD-90 LV polyol), AS2002A acrylate (a polyester acrylate derived from an adipate polyol), PS3152A acrylate (a polyester acrylate derived from STEPANPOL® PS-3152 polyol), TS3152A acrylate (a polyester acrylate derived from a tere-phthalate polyol). All these acrylate oligomers are prepared as described in the examples, except that CN963E75, CN2261 and CN120Z acrylates are commercially available and obtained from Sartomer Company (Exton, Pa.).

The following is a general description of the testing methods used in the examples.

Acid Value Determination

About 3.00 g of a sample is accurately weighed into a 250 mL titration flask, 50 mL of acetone is added to the flask, the sample is mixed to let the sample dissolve completely, 2 drops of phenolphthalein indicator are added, and the sample is titrated with 0.1000 N standardized KOH solution to a light pink end point. The acid value (AV) is calculated as:

$$AV \text{ (mg KOH/g)} = \text{(Titrant volume (mL))}(5.61)/\text{Sample weight(g)}$$

Hydroxyl Value Determination

An appropriate sample size is accurately weighed (+/−0.01 g) and added into a 250 mL flask. 25 mL standardized acetylating reagent is added into the flask by using a pipette. Boiling stones are added, and condensers are attached to the flask, which is then placed on a hot plate. The sample solution is heated to reflux for one hour, and then cooled to room temperature. The condensers are rinsed with about 50-55 mL distilled water. The rinsing water is collected into the flask. Two drops of phenolphthalein solution are added to the sample, which is then titrated with 1.000 N KOH solution to a bright red end point. The volume of the titrant used is recorded. A blank titration is run exactly in the same way as for the sample except that no sample is used. The hydroxyl number (OHV) is calculated according to the following equation:

$$OHV \text{ (mg KOH/g)} = (A - B)(1.000 \text{ N KOH})(56.1)/\text{Sample weight(g)}$$

where, A=mL of titrant used for blank, B=mL of titrant used for sample

Abrasion Resistance Test Method

ASTM D4060 is used to provide a guideline for the abrasion testing. Specifically, the coating samples are conditioned at 46% relative humidity, 75° F. (24° C.) for 60 hours for Tabor abrasion testing. Testing is performed on a Tabor Abraser 5130 with 100% vacuum, 1 Kg weight and a CS-17 wheel. Two parallel runs for each sample are performed. The sample is weighed, noted as $W_b$, then abraded on the abraser for 500 cycles. The sample is weighed again and noted as $W_{a1}$. The difference of $W_b$ and $W_{a1}$ is recorded as the weight loss for 500-cycle abrasion. The sample is abraded for another 500 cycles on the abraser and weighed thereafter. The weight is noted as $W_{a2}$. The weight difference between $W_b$ and $W_{a2}$ is called the weight loss for 1000 cycles.

MEK Resistance Test Method

A coating is evaluated for its methyl ethyl ketone (MEK) resistance following the ASTM D5402 procedure. If a coating breaks down or wear is seen visually, then such change is recorded. Otherwise, a rating scale from 1 to 5 is used to report the MEK resistance of a coating. A "5" is given to a sample that does not show any visible change in every aspect detected by unaided eyes, and a "1" is given to a coating that develops heavy haze, cloudiness or solvent mark after MEK double cheesecloth pad rubbing. All other samples are rated against these two extremes and are assigned a rating from 1 to 5 accordingly as detected by unaided eyes.

Gloss Level Measurement

ASTM D523 is followed to measure the gloss of a cured thin coating. A BYK-Gardner micro-TR1-gloss µ gloss meter, available from BYK-Gardner USA, Columbia, Md., is used. Three readings at 60° angle are taken at three different areas of a coating on the black part of a Leneta Chart along the drawdown direction and the readings are averaged to give the gloss level of the sample.

Color Measurement

To measure the color of a coating, ASTM D2244 is followed. A Minolta CM-2500d model Spectrophotometer is used. The conditions used for the measurement are 100% UV settings, D65 illuminant, 10° observer and L*a*b*color space. In the L*a*b*color space, component L* refers to the lightness coordinate; component a* refers to the red/green coordinate, with +a* indicating red, and −a* indicating green; component b* refers to the yellow/blue coordinate, with +b* indicating yellow, and −b* indicating blue). Three readings at three different spots on the sample are taken and averaged to give the final result. The color change (ΔE) of a sample is figured out using the following formula:

$$\Delta E = [(L^*_1 - L^*_2)^2 + (a^*_1 - a^*_2)^2 + (b^*_1 + b^*_2)^2]^{1/2}$$

where $L^*_1$, $a^*_1$ and $b^*_1$ are the L*, a* and b* of the coating before weathering and $L^*_2$, $a^*_2$ and $b^*_2$ are the L*, a* and b* of the coating after weathering.

Smudge Resistance Testing

To test the smudge or mar resistance of a coating, the tester sweeps an index finger wrapped with a double layer of a Kimwipes® over the coating surface, pressing down with moderate force. The swept area of the coating is checked for an appearance change. If a streak or smear is left on the coating, then a "Yes" is recorded with respect to smudges; otherwise, if the coating surface remains intact then a "No" is recorded with respect to smudges.

Weathering of Coatings and Films

Two 1×1 inch (2.5 cm×2.5 cm) squares of each coating (on Leneta Chart Form 2A) are cut out and labeled. They are randomly affixed to 4×6 inch (10 cm×15 cm) aluminum Q-Panels (available from Q-Panel Lab Products, Cleveland, Ohio) using double-side adhesive tape, the uncoated side facing the Q-Panel. The Q-Panel is placed randomly in the center of the sample tray of the Q-SUN Xenon Test Chamber (Model Xe-3-HS, available from Q-Panel Lab Products). Then the samples are weathered at a light intensity of 0.51 W/m²/nm at 340 nanometer wavelength passed through a daylight filter, a relative humidity of 70%, a black panel temperature of 77° C., and a chamber air temperature of 55° C. for a period of 168 hours.

The 1.5 mil (0.0254 mm) thin films are weathered in the same way as the coatings. However, the specimen preparation is slightly different. This time, the film strips are fixed to Q-Panels at both ends using Scotch® tape instead of double-side adhesive tape.

Tensile Strength, Elongation and Modulus Test Method

The tensile properties of cured samples are tested using a universal testing instrument, an MTS, equipped with a personal computer and TESTWORKS™ 4.0 software to yield values of tensile strength at peak, percent elongation at break, and modulus. A load cell used in the tests has a 50 pound (about 22.7 kg) capacity.

To prepare the samples for testing, a minimum of five test specimens, each having a width of 0.625±0.002 inches (about 15.88±0.05 mm) and a length of 3 inches (about 7.6 cm), are cut from the cured film on glass plates. The specimens are cut parallel to the drawdown directions. The test specimens are then removed from the substrate. Caution should be exercised not to stretch the specimens over their elastic limits during the removal. To prevent overbite by the sample grips later on when loading, both sides of each sample ends are affixed with Scotch® tape. The specimens are conditioned at 46% relative humidity, 75° F. (24° C.) for 24 hours prior to carrying out any measurement.

The average film thickness of a test specimen is determined with a BYK-Gardner micro-TR1-gloss µ gloss meter. At least five measurements of film thickness are made in the area to be tested (from top to bottom) and the average value is used for calculation. If any of the measured values of film thickness deviates from the average value by more than 10%, the test specimen is discarded.

The crosshead speed is set to 1.00 inches/minute (0.42 mm/sec.), and the crosshead action is set to "return at break". The crosshead is adjusted to 1.00 inch (2.54 cm) jaw separation. The MTS machine is calibrated and standardized according to the procedure prescribed by the manufacturer. Then, each test specimen is tested by suspending it into the space between the upper and the lower grips such that the test specimen is centered laterally and hanging vertically. The upper grip is locked. The lower end of the specimen is pulled gently so that it has no slack and buckling, and it is centered laterally in the space between the open lower grips. While holding the specimen in this position, the lower grip is locked. Then both the lower and the upper grips are tightened to such an extent that the specimen does not slip during testing. Caution should be exercised not to over tighten the grips.

The dimension (width and thickness) of the specimen and the jaw separation are entered into the computer, and the specimen is then pulled at the set speed. After the completion of each specimen, the software calculates the tensile strength at peak, percentage elongation and modulus. After all specimens of a sample are tested, the data is processed following the method suggested in ASTM D2370, and the averaged results are reported as the sample's tensile strength at peak, elongation at break and modulus.

EXAMPLE 1

Synthesis of an Adipate Diethylene Glycol Polyester Polyol AS-2002 and its Acrylate AS2002A Adipic acid (873 g) and DEG (934 g) are charged in a two liter flask equipped with a mechanical stirrer, a condenser, a nitrogen inlet and a thermal couple. A TYZOR® TNBT catalyst (0.48 g, 300 ppm, available from Du Pont, Wilmington, Del.) is added to the flask. The reaction is carried out at 200° C. under nitrogen purge. When the AV drops below 1.0 mg KOH/g, the OHV of the mixture is checked and an additional 50.6 g DEG is added to adjust the hydroxyl number to about 200 mg KOH/g. The temperature is maintained at 200° C. for two hours, and the final product is packed into cans and sealed with a nitrogen pad. For this instance, the batch has an AV of approximately 0.54 mg KOH/g and OHV of approximately 202.0 mg KOH/g, and is designated as AS-2002.

The AS-2002 polyester polyol as made above (201.2 g), acrylic acid (54.83 g, 99.5%), p-toluenesulfonic acid monohydrate (2.82 g), di-tert-butylhydroquinone (0.26 g), and toluene (90 g) are charged into a 500 mL 4-neck flask. The flask is equipped with an air inlet, a thermocouple, a mechanical stirrer and an azeotropic distillation condenser. Throughout the reaction process, the reaction mixture is stirred and purged by air. The mixture is heated to 116° C. and maintained at this temperature for approximately one hour. Then the reaction mixture is heated from 116° C. to 122° C. over three hours. During this period, the temperature is increased by 2° C. every hour. The reaction mixture is vacuum distilled at 110° C. and 28 inch of mercury gauge vacuum (50 Torr or 5 mm mercury) for about two hours. Glycidyl methacrylate (5.6 g) is added to the flask and allowed to stir at 110° C. while being purged with air for two hours. The batch is cooled to room temperature. In this instance, the resulting polyester acrylate (designated as AS2002A) is clear and has an AV of approximately 1.8 mg KOH/g.

EXAMPLE 2

Synthesis of a Tere-phthalate Polyol TS-3152 and its Acrylate TS3152A

TPA (593 g) and DEG (770 g) are charged in a two liter flask equipped with a mechanical stirrer, a condenser, a nitrogen inlet and a thermal couple. FASCAT® 4102 tin catalyst (0.12 g, 100 ppm, available from Arkema Group, Paris, France) was added to the flask. The reaction is carried out at 210° C. under nitrogen purge. When the AV of the reaction mixture drops below 25 mg KOH/g, TYZOR® TBT titanium catalyst (0.25 g, 200 ppm, available from Du Pont, Wilmington, Del.) is added and the reaction is continued until the AV drops below 3 mg KOH/g. The OHV of the mixture is checked, and an additional 190 g of DEG is added to adjust the hydroxyl number to about 315 mg KOH/g. The temperature is maintained at 190° C. for two hours, and the final product is packed into cans and sealed with a nitrogen pad. In this instance, the batch has a moisture content of about 0.03%, an AV of about 2.0 mg KOH/g and OHV of about 315.8 mg KOH/g, and is designated as TS-3152.

The TS-3152 polyester polyol as synthesized above (188.4 g), acrylic acid (80.2 g, 99.5%), p-toluenesulfonic acid monohydrate (2.97 g), di-tert-butylhydroquinone (0.27 g), and toluene (94 g) are charged into a 500 mL 4-neck flask. The esterification is carried out following the same procedure as described above for the synthesis of the AS2002A acrylate. After the esterification is completed, glycidyl methacrylate (12.1 g) is added to the flask and the batch is allowed to stir at 110° C. while air being purged for two hours. The batch is cooled to room temperature. The resulting polyester acrylate (designated as TS3152A) in this instance is clear and has an acid number of about 9.3 mg KOH/g.

EXAMPLE 3

Synthesis of Ortho-phthalate Acrylate PS2002A

STEPANPOL® PS-2002 polyol (available from Stepan Company, Northfield, Ill.) is a polyester polyol made from phthalic anhydride and diethylene glycol having an OHV of about 200. In this example, STEPANPOL® PS-2002 polyol is acrylated to make an ortho-phthalate acrylate designated as PS2002A.

More specifically, STEPANPOL® PS-2002 polyol (237.1 g), acrylic acid (62.4 g, 99.5%), p-toluenesulfonic acid monohydrate (3.31 g), di-tert-butylhydroquinone (0.30 g), and toluene (105 g) are charged into a 500 mL 4-neck flask. The esterification is carried out following the same procedure as described above for the synthesis of the AS2002A acrylate. After the esterification is completed, glycidyl methacrylate (3.8 g) is added to the flask, and the batch is allowed to stir at 110° C. while air being purged for two hours. The batch is cooled to room temperature. The resulting polyester acrylate in this instance is clear and has an acid number of about 4.2 mg KOH/g and a viscosity of about 4700 cP at 25° C.

EXAMPLE 4

Synthesis of Ortho-phthalate Acrylate PS3152A

STEPANPOL® PS-3152 polyol (available from Stepan Company, Northfield, Ill.), is also a polyester polyol made from phthalic anhydride and diethylene glycol that has an OHV of about 315. In this example, STEPANPOL® PS-3152 polyol is acrylated to make another ortho-phthalate acrylate designated as PS3152A.

More specifically, STEPANPOL® PS-3152 polyol (204.8 g), acrylic acid (87.2 g, 99.5%), p-toluenesulfonic acid monohydrate (3.22 g), di-tert-butylhydroquinone (0.29 g), and toluene (102 g) are charged into a 500 mL 4-neck flask. The esterification is carried out following the same procedure as described for the synthesis of the AS2002A acrylate. After the esterification is completed, glycidyl methacrylate (7.2 g) is added to the flask, and the batch is allowed to stir at 110° C. while air being purged for two hours. The batch is cooled to room temperature. The resulting polyester acrylate in this instance is clear and has an acid number of about 1.6 mg KOH/g and a viscosity of about 568 cP at 25° C.

EXAMPLE 5

Synthesis of Ortho-phthalate Urethane Acrylate PD90LV-UA

STEPANPOL® PD-90 LV polyol, which is a polyesterether polyol derived from phthalic anhydride, diethylene glycol, and propylene oxide, is used in this example to make an ortho-phthalate based urethane acrylate (designated as PD90LV-UA). STEPANPOL® PD-90 LV polyol is a modified polyester polyol as described in U.S. Pat. Nos. 6,569,352 and 6,855,844, and available from Stepan Company, Northfield, Ill.

More specifically, STEPANPOL® PD-90 LV polyol (249.4 g), hydroquinone monomethyl ether (0.03 g), 2,6-di-t-butyl-4-methyl phenol (0.14 g), and dibutyltin dilaurate (0.14 g) are charged into a one L 4-neck flask equipped with a stirrer, nitrogen purge, thermocouple and a condenser. The polyol mixture is heated to 55° C. and then Mondur® TD-80 (69.1 g, an isocyanate available from Bayer Corporation, Pittsburgh, Pa.) is added. The temperature rises to 81.5° C., and the mixture is cooled to 70° C. After 2.5 hours at 70° C., the reaction has a percent NCO value of 3.49% as determined according to the method described in ASTM D 272-91. 2-Hydroxyethyl acrylate (46.1 g) is then added to the prepolymer. The temperature is increased to 78° C., and the mixture is stirred for approximately 1.5 hours. After this time, infrared analysis does not show any isocyanate peaks, and the reaction is stopped. The polyurethane acrylate in this instance has a viscosity of about 9500 cP at 70° C.

EXAMPLE 6

Comparative Study of the Acrylates of Examples 1-5 and Commercially Available Acrylates CN963E75, CN2261 and CN120Z The five acrylates (AS2002A, TS3152A, PS3152A, PS2002A, and PD90LV-UA) made in Examples 1-5 and three commercially available acrylates (CN963E75, CN2261 and CN120Z) are examined in this example to show the advantages of the presently described technology. The eight acrylates are formulated into eight energy curable compositions as designated in Table 1 below.

TABLE 1

Curable Composition Designations

| Curable Compositions | Acrylate Oligomers Used |
|---|---|
| A | AS2002A |
| B | TS3152A |
| C | PS3152A |
| D | PS2002A |
| E | PD90LV-UA |
| F | CN120Z |
| G | CN963E75 |
| H | CN2261 |

A simple formulation is employed for all eight compositions. This formulation includes an oligomer, a reactive monomer as the diluent and two photoinitators as shown in Table 2 below. More specifically, each composition has 32.25 weight % of hexanediol diacrylate as a reactive diluent, 2.0 weight % of IRGACURE® 651 and 0.75 weight % of IRGA-CURE® 819 as photoinitators, and 65.0 weight % of the acrylate oligomer.

TABLE 2

Formulation used to evaluate performance of an oligomer acrylate

| Component | Amount (weight %) |
|---|---|
| Acrylate oligomer | 65 |
| Acrylate reactive monomer | 32.25 |
| Photoinitiator 1 (IRGACURE ® 651) | 2.0 |
| Photoinitiator 2 (IRGACURE ® 819) | 0.75 |
| Total | 100 |

For all eight compositions A-H, the amounts of components are kept constant, and the types of the photoinitators are also constant. The oligomers used in the compositions are varied for purposes of comparing the effect of an oligomer, the effect of a polyol, or the effect of the functionality of a composition on the performance of the cured finish of the composition.

Each composition is coated on an aluminum panel and a PET film using a #40 Meyer rod, and subsequently cured in a Fusion UV FS300 curing unit under the same conditions. More specifically, the photoinitators are mixed with the reactive diluent first to form a clear solution. The corresponding oligomers are added and mixed until homogeneous mixtures are obtained. The #40 Meyer rod is used to draw down the composition onto an appropriate substrate to form a uniform layer of the wet coating. Immediately, the coated aluminum panel is placed on the conveyer belt (coated side facing lamp) of a Fusion UV curing unit equipped with a 300 W/inch (118 W/cm) H-bulb. The coating is cured at a line speed of 100 feet per minute (30.48 m/min) for a total of four passes unless specified. The coatings made are listed in Table 3.

The resultant coatings are subjected to an aging process as described above for weathering of coatings and films for 7 days in a Q-SUN weatherometer under the condition of 70% relative humidity, 77° C. black panel temperature, 55° C. chamber air temperature and a light intensity of 0.51 W/m$^2$/nm at 340 nanometer wavelength passed through a daylight filter.

The weathered coating samples are examined for physical integrity and are characterized for color and mechanical property changes in terms of physical appearance and Tabor abrasion weight loss using the corresponding methods described above. The results are shown in Table 3.

TABLE 3

| | A (wt. %) | B (wt. %) | C (wt. %) | D (wt. %) | E (wt. %) | F (wt. %) | G (wt. %) | H (wt. %) |
|---|---|---|---|---|---|---|---|---|
| HDODA | 32.25 | 32.25 | 32.25 | 32.25 | 32.25 | 32.25 | 32.25 | 32.25 |
| AS2002A | 65.00 | | | | | | | |
| TS3152A | | 65.00 | | | | | | |
| PS3152A | | | 65.00 | | | | | |
| PS2002A | | | | 65.00 | | | | |
| PD-90LV-UA | | | | | 65.00 | | | |
| CN120Z | | | | | | 65.00 | | |
| CN963E75 | | | | | | | 65.00 | |
| CN2261 | | | | | | | | 65.00 |
| IRGACURE ® 651 | 2.00 | 2.00 | 2.00 | 2.00 | 2.00 | 2.00 | 2.00 | 2.00 |
| IRGACURE ® 819 | 0.75 | 0.75 | 0.75 | 0.75 | 0.75 | 0.75 | 0.75 | 0.75 |
| After weathering: | | | | | | | | |
| Appearance | Too fragile and chipped | Slightly chipped | Intact | Intact | | | | |
| Color change (ΔE) | 2.7 | 6.3 | 2.7 | 1.6 | | | | |
| Tabor abrasion weight loss (mg): | | | | | | | | |
| 500 cycles | | | | | 11.6 | 22.7 | 12.6 | 12.2 |
| 1000 cycles | | | | | 26.0 | 40.3 | 29.7 | 31.0 |

It is found that after weathering, coating A comprising adipate acrylate becomes too fragile and substantially chips off, coating B comprising tere-phathalate acrylate yellows and hardens significantly and chips slightly, while the two coatings C and D made from the polyester acrylates of the presently described technology maintain their physical integrity in terms of their resistance to chipping and color change. It is also found that after weathering, coating E made from urethane acrylate PD90LV-UA of the present technology shows better abrasion resistance than coatings F—H made from the commercially available acrylates.

EXAMPLE 7

Polyol Weathering Tests

Acid value changes of various polyester polyols after weathering are tested in this example. The various polyester polyols are:
A: DESMOPHEN® S-1011-55, a 55 hydroxyl number polyester polyol derived from adipic acid and diethylene glycol, available from Bayer MaterialScience LLC, Pittsburgh, Pa.;
B: TONE™ 0201, a diethylene glycol initiated polycaprolactone, available from Dow Chemical Company, Midland, Mich.;
C: TS-3152, a tere-phthalic acid and diethylene glycol condensed polyol having a hydroxyl number of about 315 as made in Example 2 above;
D: STEPANPOL® PS-3152 as used in Example 4 above;
E: STEPANPOL® PS-2002 as used in Example 3 above; and
F: STEPANPOL® PD-56, a polyester polyol derived from phthalic anhydride and diethylene glycol available from Stepan Company having a nominal hydroxyl number of 56.

Figure 3:
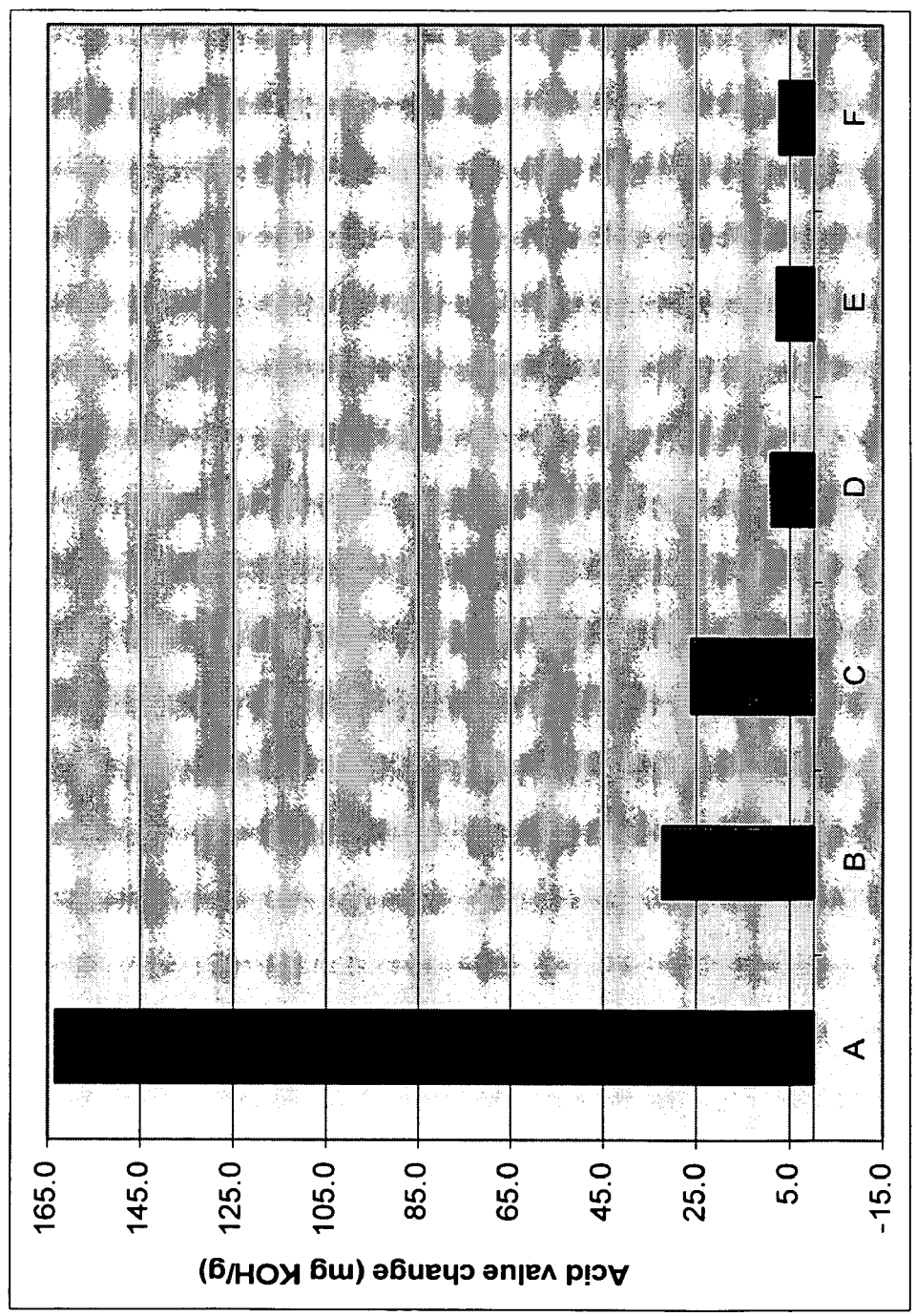
FIG. 3 is a chart showing the acid value change of various polyester polyols after weathering.

In the tests, about 75 g of each polyol is poured into a smooth no-handle aluminum weighing dish of 140 mL capacity. Additionally, approximately 100 g of each of the polyols is poured in a 120 mL glass bottle which is sealed tightly and stored at room temperature for use as a control. The samples in dishes are exposed to light, heat and humidity in a Q-SUN Xenon Test Chamber (Model Xe-3-HS) operated at a light intensity of 0.51 W/m²/nm at 340 nanometer wavelength passed through a daylight filter, a relative humidity of 70%, a black panel temperature of 77° C. and a chamber air temperature of 55° C. The test includes a straight continuous light cycle for a period of 890 hours. This corresponds to a total dosage of 1635 KJ/m² at 340 nm wavelength. The samples are rotated once every 72 hours following the procedure in the Q-SUN manual. The samples are analyzed for acid value and compared to the acid value of the retained samples. The results are presented in FIG. 3.

The results show that after weathering, the acid values of polyols D, E, and F, which are all ortho-phthalate polyols suitable for the presently described technology, changed the least as compared to polyols A, B, and C.

EXAMPLE 8

Synthesis of Ortho-phthalate Acrylate PD200LVA

STEPANPOL® PD-200 LV polyol (available from Stepan Company, Northfield, Ill.), is also a polyester polyol made from phthalic anhydride, diethylene glycol, and other additives (including polyether and soybean oil) that is modified with trimethylol propane and polypropylene glycol to have an OHV of about 200. STEPANPOL® PD-200 LV polyol is a modified polyester polyol as described in U.S. Pat. No. 6,664, 363 (Stepan Company, Northfield, Ill.). In this example, STEPANPOL® PD-200 LV polyol is acrylated to make another ortho-phthalate acrylate designated as PD200LVA.

More specifically, STEPANPOL® PD-200 LV polyol (205.0 g), acrylic acid (67.8 g, 99.5%), p-toluenesulfonic acid monohydrate (3.46 g), di-tert-butylhydroquinone (0.31 g), and toluene (102 g) are charged into a 500 mL 4-neck flask. The esterification is carried out following the same procedure as described for the synthesis of the AS2002A acrylate. After the esterification is completed, glycidyl methacrylate (8.9 g) is added to the flask, and the batch is allowed to stir at 110° C. while air being purged for two hours. The batch is cooled to room temperature, and the resulting polyester acrylate in this instance is clear and has an acid number of about 1.4 mg KOH/g and a viscosity of about 1605 cP at 25° C.

EXAMPLE 9

Synthesis of an Ortho-phthalate Diethylene Glycol Polyester Polyol Agent 3217-28 and its Acrylate Agent 3217-44

STEPANPOL® PS-2002 (1496 g) and trimethylolpropane (366 g) are charged in a two liter flask equipped with a mechanical stirrer, a condenser, a nitrogen inlet and a thermal couple. The mixture is heated under nitrogen bubbling and stirring to 200° C., and TYZOR® TNBT catalyst (0.19 g, 100 ppm, available from Du Pont, Wilmington, Del.) is added to the flask. The reaction is allowed to proceed for 3 hours, and then the product is packed into cans and sealed with a nitrogen pad. For this instance, the batch has an AV of approximately 1.0 mg KOH/g and OHV of approximately 411.0 mg KOH/g, and is designated as Agent 3217-28.

The Agent 3217-28 polyester polyol as made above (185.0 g), acrylic acid (102.6 g, 99.5%), p-toluenesulfonic acid monohydrate (3.18 g), di-tert-butylhydroquinone (0.29 g), and toluene (101 g) are charged into a 500 mL 4-neck flask. The esterification is carried out following the same procedure as described for the synthesis of the AS2002A acrylate. After the esterification is completed, glycidyl methacrylate (9.3 g) is added to the flask, and the batch is allowed to stir at 110° C. while air being purged for two hours. The batch is cooled to room temperature. and The resulting polyester acrylate in this instance is clear and has an acid number of about 1.8 mg KO11/g and a viscosity of about 2435 cP at 25° C.

EXAMPLE 10

Synthesis of Ortho-phthalate Acrylate PS4002A

STEPANPOL® PS-4002 polyol (available from Stepan Company, Northfield, Ill.), is also a polyester polyol made from phthalic anhydride and diethylene glycol that has an OHV of about 400. In this example, STEPANPOL® PS-4002 polyol is acrylated to make another ortho-phthalate acrylate designated as PS4002A.

More specifically, STEPANPOL® PS4002 polyol (418.0 g), acrylic acid (221.3 g, 99.5%), p-toluenesulfonic acid monohydrate (7.06 g), di-tert-butylhydroquinone (0.64 g), and toluene (224 g) are charged into a 1000 mL 4-neck flask. The esterification is carried out following the same procedure as described for the synthesis of the AS2002A acrylate. After the esterification is completed, glycidyl methacrylate (20.9 g) is added to the flask, and the batch is allowed to stir at 110° C. while air being purged for two hours. The batch is cooled to room temperature, and the resulting polyester acrylate in this instance is clear and has an acid number of about 1.3 mg KOH/g and a viscosity of about 252 cP at 25° C.

EXAMPLE 11

Comparative Study of UV Curable Compositions I-V

In this example, 14 UV curable compositions I-V are formulated as shown in Table 4 below. More specifically, composition I is formulated according to Example 14 of U.S. Pat. No. 6,714,712 (DSM N.V., Heerlen, Netherlands); compositions J and K contain polyester acrylates made in Examples 1-2 above; compositions L-Q contain different commercially available polyester acrylates and an epoxy acrylate from different suppliers; and compositions R to V employ acrylates of the presently described technology as made above in Examples 3, 4, and 8-10. Coatings or films made from these compositions as described below are examined to show the advantages of the presently described technology.

Coating and Film Preparation

The photoinitators and additives as listed in Table 4 are first mixed with reactive diluents (SR502 for composition I; SR306 for the rest) to form a clear solution. The corresponding oligomer for each composition is added to the clear solution, and mixed until a homogeneous mixture is obtained. Coatings or films are made from the UV curable compositions I-V, which are then aged and examined for their gloss, MEK resistance, color change, smudge resistance, and mechanical properties after weathering according to the corresponding methods described above.

For evaluation of gloss, MEK resistance, color change and smudge resistance, thin coatings are cast on the front side of Leneta Charts Form 2A (5.5×10 inches (14.0×25.4 cm), available from The Leneta Company, Mahwah, N.J.) using a #6 Meyer rod. Immediately thereafter, the coated Leneta Chart is placed on the conveyor belt (coated side facing lamp) of a Fusion UV F300S curing unit equipped with an I300 MB irradiator and 300 W/inch (12 W/cm) H-bulb. The coating is cured at a line speed of 100 feet per minute (30.48 m/min) for one pass, which corresponds to a curing dosage of about 0.33 $J/cm^2$. The coatings thus prepared have a coat weight of approximately 7 grams per square meter.

For evaluation of mechanical properties, thin films are cast on clean plain glass plates (6×12 inches (15 cm×30 cm), available from Herb's Glass and Mirror, Elgin, Ill.) using a 1.5 mil (0.0254 mm) BYK-Gardner bird-type film applicator (drawdown bar). Immediately, the coated glass plate is placed on the conveyor belt (coated side facing lamp) of a Fusion UV F300S curing unit equipped with an I300 MB irradiator and 300 W/inch (12 W/cm) H-bulb. The coating is cured at a line speed of 33 feet per minute (10 m/min) for one pass, which corresponds to a curing dosage of about 1.0 $J/cm^2$. The coatings thus prepared have a coat weight of approximately 38 grams per square meter.

TABLE 4

|  | I (wt. %) | J (wt. %) | K (wt. %) | L (wt. %) | M (wt. %) | N (wt. %) | O (wt. %) |
| --- | --- | --- | --- | --- | --- | --- | --- |
| SR306 |  | 30.03 | 30.03 | 30.03 | 30.03 | 30.03 | 30.03 |
| SR502 | 22.0 |  |  |  |  |  |  |
| PS4002A |  |  |  |  |  |  |  |
| PS3152A |  |  |  |  |  |  |  |
| PS2002A | 31.7 |  |  |  |  |  |  |
| PD200LVA |  |  |  |  |  |  |  |
| Agent 3217-44 |  |  |  |  |  |  |  |
| AS2002A |  | 61.07 |  |  |  |  |  |
| TS3152A |  |  | 61.07 |  |  |  |  |
| Ebecryl 450 |  |  |  | 61.07 |  |  |  |
| Ebecryl 810 |  |  |  |  | 61.07 |  |  |
| CN2250 |  |  |  |  |  | 61.07 |  |
| CN2270 |  |  |  |  |  |  | 61.07 |
| CN120Z | 33.0 |  |  |  |  |  |  |
| PHOTOMER 4039 | 10.0 |  |  |  |  |  |  |
| PHOTOMER 5429 |  |  |  |  |  |  |  |
| Chivacure ® 184 | 1.0 |  |  |  |  |  |  |
| Chivacure ® TPO | 0.7 |  |  |  |  |  |  |
| IRGNOX 1035 | 0.3 |  |  |  |  |  |  |
| IRGACURE 819 | 0.3 |  |  |  |  |  |  |
| DAROCUR 1173 | 1.0 | 4.0 | 4.0 | 4.0 | 4.0 | 4.0 | 4.0 |
| Triethanolamine | 2.0 | 2.0 | 2.0 | 2.0 | 2.0 | 2.0 | 2.0 |
| Benzophenone | 2.0 | 2.0 | 2.0 | 2.0 | 2.0 | 2.0 | 2.0 |
| DC-190 | 0.9 | 0.9 | 0.9 | 0.9 | 0.9 | 0.9 | 0.9 |
| 7 GSM film: |  |  |  |  |  |  |  |
| 50 MEK resistance | 5.0 | 3.0 | 4.0 | 4.0 | 2.0 | 4.8 | 1.0 |
| 60° Gloss on black | 95.2 | 85.2 | 90.5 | 87 | 84.2 | 94.6 | 83.1 |
| Smudges | Yes | Yes | No | No | Yes | No | Yes |
| Color change (ΔE) | 2.7 | 1.0 | 1.9 | 1.0 | 1.0 | 5.7 | 1.0 |
| 1.5 mil film: |  |  |  |  |  |  |  |
| Tensile (MPa) | 22.5 | 2.6 | 14.4 | 12.8 | 8.9 | 15.0 | 1.7 |
| Modulus (MPa) | 461 | 27.0 | 697 | 1715 | 649 | 1250 | .98 |
| Elongation (%) | 21.5 | 10.2 | 12.2 | 1.9 | 4.0 | 5.9 | 3.5 |
| After weathering (Appearance): | intact | broke | broke | broke | broke | intact | broke |

TABLE 4-continued

| | P (wt. %) | Q (wt. %) | R (wt. %) | S (wt. %) | T (wt. %) | U (wt. %) | V (wt. %) |
|---|---|---|---|---|---|---|---|
| SR306 | 30.03 | 30.03 | 30.03 | 30.03 | 30.03 | 30.03 | 30.03 |
| SR502 | | | | | | | |
| PS4002A | | | 61.07 | | | | |
| PS3152A | | | | 61.07 | | | |
| PS2002A | | | | | 61.07 | | |
| PD200LVA | | | | | | 61.07 | |
| Agent 3217-44 | | | | | | | 61.07 |
| AS2002A | | | | | | | |
| TS3152A | | | | | | | |
| Ebecryl 450 | | | | | | | |
| Ebecryl 810 | | | | | | | |
| CN2250 | | | | | | | |
| CN2270 | | | | | | | |
| CN120Z | 61.07 | | | | | | |
| PHOTOMER 4039 | | | | | | | |
| PHOTOMER 5429 | | 61.07 | | | | | |
| Chivacure ® 184 | | | | | | | |
| Chivacure ® TPO | | | | | | | |
| IRGNOX 1035 | | | | | | | |
| IRGACURE 819 | | | | | | | |
| DAROCUR 1173 | 4.0 | 4.0 | 4.0 | 4.0 | 4.0 | 4.0 | 4.0 |
| Triethanolamine | 2.0 | 2.0 | 2.0 | 2.0 | 2.0 | 2.0 | 2.0 |
| Benzophenone | 2.0 | 2.0 | 2.0 | 2.0 | 2.0 | 2.0 | 2.0 |
| DC-190 | 0.9 | 0.9 | 0.9 | 0.9 | 0.9 | 0.9 | 0.9 |
| 7 GSM film: | | | | | | | |
| 50 MEK resistance | 5.0 | 3.0 | 4.9 | 5.0 | 4.5 | 3.5 | 5.0 |
| 60° Gloss on black | 96.3 | 84.1 | 90.9 | 90.9 | 93.6 | 89.0 | 91.5 |
| Smudges | No | Yes | No | No | No | No | No |
| Color change (ΔE) | 10.6 | 1.2 | 1.0 | 1.0 | 1.0 | 1.0 | 1.0 |
| 1.5 mil film: | | | | | | | |
| Tensile (MPa) | 49.8 | 3.2 | 16.1 | 18.6 | 10.6 | 3.7 | 20.3 |
| Modulus (MPa) | 2204 | 119 | 214 | 203 | 72 | 47.4 | 329 |
| Elongation (%) | 6.6 | 7.1 | 21.8 | 20.5 | 14.7 | 8.5 | 16.0 |
| After weathering (Appearance): | intact | broke | intact | intact | intact | intact | intact |

SR306 is a tripropylene glycol diacrylate available from Sartomer Company (Exton, PA)
SR502 is an ethoxylated trimethylolpropane triacrylate supplied by Sartomer Company
Ebercyl 450 is a fatty acid modified polyester hexaacrylate available from Cytec Surface Specialties (Brussels, Belgium)
Ebercyl 810 is a polyester tetraacrylate available from Cytec Surface Specialties
CN2250 is a polyester tetraacrylate available from Sartomer Company
CN2270 is a polyester diacrylate available from Sartomer Company
CN120Z is a bisphenol A epoxy diacrylate available from Sartomer Company
PHOTOMER 4039 is an ethoxylated (n = 3) phenoxy ethyl acrylate supplied by Cognis Corporation (Cincinnati, OH)
PHOTOMER 5429 is a polyester tetraacrylate available from Cognis Corporation
Chivacure 184 is 1-hydroxyl-cyclohexyl-phenyl-ketone, available from Chitec Chemical Company, Ltd. (Taiwan, ROC)
Chivacure TPO is 2,4,6-trimethylbenzoyl diphenyl phosphine oxide, available from Chitec Chemical Company, Ltd.
IRGONOX 1035 is thiodiethylene bis[3-(3,5-di-tert-butyl-4-hydroxyphenyl)propionate], available from Ciba Specialty Chemicals, Inc. (Tarrytown, NY)
IRGACURE 819 is bis(2,4,6-trimethylbenzoyl)-phenyl-phosphine-oxide, available from Ciba Specialty Chemicals
DAROCURE 1173 is 2-hydroxy-2-methyl-1-phenylpropan-1-one, available from Ciba Specialty Chemicals
DC-190 is (dimethylsiloxane)-(polyoxylpropylene/polyoxyethylene glycol acetate) copolymer from Dow Corning Corporation (Midland, Michigan)

The experimental results of the films and coatings made from compositions I-V are recorded in Table 4. The experiment regarding comparative composition I, which is a repeat of Example 14 of U.S. Pat. No. 6,714,712 (Table 4), shows that the cured composition I does not maintain physical integrity, as the term is defined in the present application. More specifically, for example, the color change of the 7 GSM film made from composition I is 2.7, as compared to 1.0 for the films made from compositions R-V containing oligomers of the presently described technology. The cured compositions J-Q do not show both elements (intact appearance and limited color change) used to define physical integrity. Each of the cured comparative compositions J-Q shows at least one of the following: (1) substantial discoloration, or (2) breakdown into pieces or becoming too brittle to handle. On the other hand, the cured compositions R-V employing the oligomers of the presently described technology discolor only slightly and remain intact after weathering.

Also importantly, the cured compositions R-V employing the presently described technology have overall better performance than comparative compositions I-Q in terms of resistance to MEK rub, resistance to marring and smudging, furnishing high gloss and providing good strength, elongation, and/or modulus. For example, none of the cured compositions R-V smudges, and even the very flexible cured composition U does not smudge. On the other hand, in the comparative compositions, not only do the flexible cured compositions J, O, and Q smudge, the hard cured compositions I and N smudge as well. For another example, the cured compositions R-V of the present technology have overall good elongation and tensile strength. This indicates that these cured compositions are tough. This is in contrast to the cured comparative compositions which are either hard and brittle (K, L, M, N and P) or simply weak (J, O and Q). The cured comparative composition I has relatively good elongation and tensile strength, but it yellows significantly after weathering. In addition, the cured compositions R-V all have a high gloss level of over 89.

What is claimed is:

1. A radiation-curable composition comprising:
   (a) at least one ortho-phthalate (meth)acrylate oligomer which is the reaction product of an ortho-phthalate modified polyester polyol with (meth)acrylic acid or a derivative thereof, wherein the ortho-phthalate modified polyester polyol is selected from the group consisting of (i) an ortho-phthalate polyester-ether polyol, and (ii) the reaction product of an ortho-phthalic acid-based material with diethylene glycol, a higher functional polyol having an average functionality of greater than two, and a long chain alkyl acid, ester or oil, wherein the reaction product has an average functionality of two;
   (b) optionally, at least one photoinitiator; and
   (c) optionally, at least one reactive diluent,
wherein the composition maintains physical integrity when cured and then aged for 7 days under the conditions of 70% relative humidity, 77° C. black panel temperature, 55° C. chamber air temperature and a light intensity of 0.51 W/m$^2$/nm at 340 nanometer wavelength passed through a daylight filter.

2. The radiation-curable composition of claim 1, wherein the polyester-ether polyol is a reaction product of phthalic anhydride or ortho-phthalic acid, diethylene glycol, and propylene oxide.

3. The radiation-curable composition of claim 1 further comprising a phosphate acrylate.

4. A process comprising applying the composition of claim 1 on a substrate; and applying ultraviolet irradiation or accelerated electron beams to the substrate to cure the composition.

5. A radiation-curable composition consisting essentially of:
   (a) one or more ortho-phthalate (meth)acrylate oligomers which are the reaction product of an ortho-phthalate polyol with (i) a (meth)acrylic acid or a derivative thereof: or (ii) an isocyanate compound having a functionality of two and a hydroxyl containing (meth)acrylic compound;
   (b) optionally, at least one photoinitiator; and
   (c) optionally, at least one reactive diluent,
wherein the composition maintains physical integrity when cured and then aged for 7 days under the conditions of 70% relative humidity, 77° C. black panel temperature, 55° C. chamber air temperature and a light intensity of 0.51 W/m$^2$/nm at 340 nanometer wavelength passed through a daylight filter.

6. The radiation-curable composition of claim 5, wherein the ortho-phthalate polyol is a polyester-ether polyol.

7. The radiation-curable composition of claim 6, wherein the polyester-ether polyol is a reaction product of phthalic anhydride or ortho-phthalic acid, diethylene glycol, and propylene oxide.

8. The radiation-curable composition of claim 5, wherein the ortho-phthalate polyol has an average functionality of two and is the reaction product of an ortho-phthalic acid based material with diethylene glycol, a higher functional polyol having an average functionality of greater than two, and a long chain alkyl acid, ester or oil.

9. The radiation-curable composition of claim 5, wherein the composition further comprises a phosphate acrylate.

10. A process comprising applying the composition of claim 5 on a substrate; and applying ultraviolet irradiation or accelerated electron beams to the substrate to cure the composition.

11. The radiation-curable composition of claim 5, wherein the hydroxyl containing (meth)acrylic compound is hydroxy ethyl (meth)acrylate or (meth)acrylic acid.

* * * * *